(No Model.)
F. L. ARMAS.
CRUPPER STRAP FASTENER.
No. 475,655. Patented May 24, 1892.
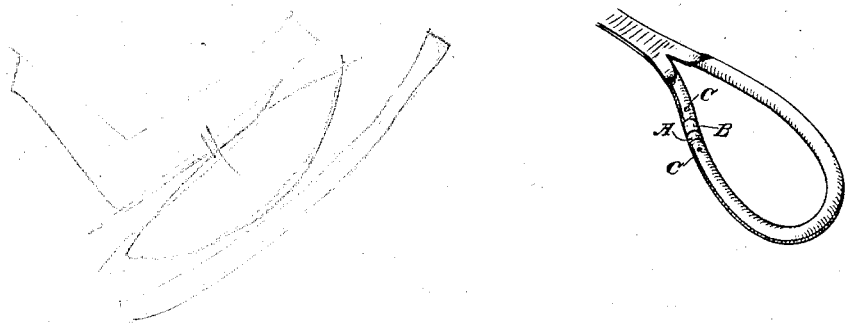
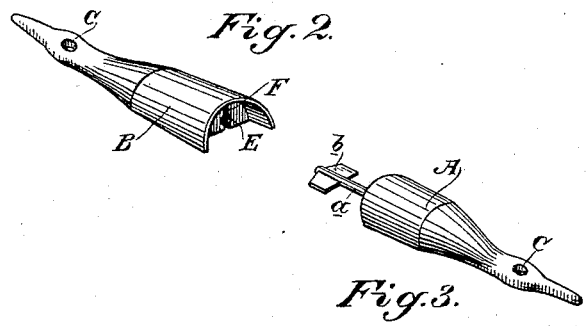
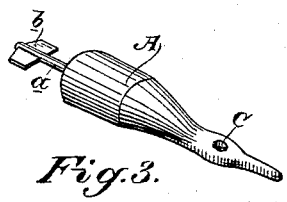
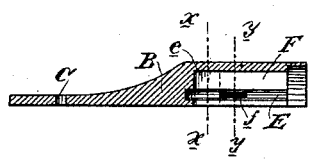
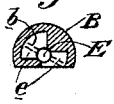 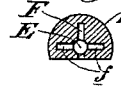
Witnesses
Inventor,
Fabricio L. Armas
By Dewey & Co.
Attys

UNITED STATES PATENT OFFICE.

FABRICIO L. ARMAS, OF PESCADERO, CALIFORNIA.

CRUPPER-STRAP FASTENER.

SPECIFICATION forming part of Letters Patent No. 475,655, dated May 24, 1892.

Application filed February 10, 1892. Serial No. 421,014. (No model.)

*To all whom it may concern:*

Be it known that I, FABRICIO L. ARMAS, a citizen of the United States, residing at Pescadero, San Mateo county, State of California, have invented an Improvement in Crupper-Strap Fastenings; and I hereby declare the following to be a full, clear, and exact description of the same.

My invention relates to a fastening device for the meeting ends of harness and for other straps.

It consists in certain details of construction, which will be more fully explained by reference to the accompanying drawings, in which—

Figure 1 is a view of a crupper-strap with my fastening attached to it. Figs. 2 and 3 show the two parts of the fastening detached. Fig. 4 is a longitudinal cross-section through the part B. Fig. 5 is a vertical cross-section of the same on line $x\,x$ of Fig. 4. Fig. 6 is a similar view on line $y\,y$ of Fig. 4.

The object of my invention is to provide a fastening for the meeting ends of harness-straps, which will enable the operator to secure these parts together with rapidity.

This device is especially useful upon crupper-straps, which it is often difficult to properly secure upon young or timid horses.

It consists of two parts A and B. The part A is secured to one part of the strap, as shown at C. This part A is made of any suitable metal of sufficient strength, and is so formed as to be inserted into the strap end, where it is stitched in and secured by a rivet or other fastening. This part A is shown in the present case made flat in order to fit within the end of the strap, and it has a round shank $a$ with two wings $b$ at the opposite end, forming a sort of spear-head. The part B of the fastening is secured to the opposite end of the strap in a manner similar to that described for fastening the part A. The end which is presented toward the part A is suitably formed to properly meet the adjacent end of A, and it has a hole E made longitudinally in it of sufficient diameter and length to receive the round shank $a$ of the opposite part. A slot F is made transversely and radially from this opening and of sufficient width to admit the wings $b$ of the opposite part A. At the inner end segmental chambers $e$ are made of sufficient diameter to allow the flanges $b$ to turn within them, these chambers being concentric with the central hole or opening, so that when the shaft $a$ is turned around after it has been inserted far enough to bring the wings into these chambers the wings will turn so that they will stand at right angles with the position which they occupy when introduced. Slots $f$ are made in line with the wings when in this position, so that the wings can be drawn into these slots, and thus locked and prevented from turning, and when in this position the two parts A and B of the fastening are in the line of the proper position of the two straps which they unite. In order to separate these parts, the part A is first pushed toward the part B until the wings lie within the chambers within which they are turned till they stand at right angles with the locked position, when the wings will be in line with the slot which extends to the outer end of the part B, and the shank $a$ may then be drawn out, thus separating the two ends of the strap.

By this construction I have a secure fastening, which may be rapidly connected and disconnected.

Having thus described my invention, what I claim as new, and desire to secure by Letters Patent, is—

A fastening for the meeting ends of straps, consisting of the part B, having a flattened inner end adapted to be secured to one end of the strap and having a hole made longitudinally in its outer end, a slot extending across said hole transversely, and a chamber at the inner end concentric with the hole and having locking-slots made in it at right angles with the entering slots, in combination with the shank A, having a flattened inner end adapted to be secured to the opposite end of the strap, having its outer end adapted to enter the hole in the part B and provided with the radial wings $b$, adapted to slide into the radial slots and subsequently turn within the chambers at the inner end, where they are locked, substantially as herein described.

In witness whereof I have hereunto set my hand.

FABRICIO L. ARMAS.

Witnesses:
S. H. NOURSE,
J. A. BAYLESS.